United States Patent
Kikuchi

(10) Patent No.: US 7,564,952 B2
(45) Date of Patent: Jul. 21, 2009

(54) RADIO ACCESS NETWORK SYSTEM AND A METHOD OF FAULT ANALYSIS FOR THE SYSTEM THEREOF

(75) Inventor: Tsuneyuki Kikuchi, Tokyo (JP)

(73) Assignee: NEC Corporation, Tokyo (JP)

( * ) Notice: Subject to any disclaimer, the term of this patent is extended or adjusted under 35 U.S.C. 154(b) by 688 days.

(21) Appl. No.: 11/368,449

(22) Filed: Mar. 7, 2006

(65) Prior Publication Data

US 2006/0215613 A1    Sep. 28, 2006

(30) Foreign Application Priority Data

Mar. 8, 2005   (JP) ............................. 2005-063363

(51) Int. Cl.
H04M 1/24 (2006.01)
H04M 3/08 (2006.01)
H04M 3/22 (2006.01)

(52) U.S. Cl. .................. 379/9; 455/67.11; 455/67.7

(58) Field of Classification Search ............... 379/1.01, 379/9, 10.01, 15.01, 27.01, 39.01, 32.01; 455/8, 9, 14, 63.1, 66.1, 67.11, 67.13, 67.16, 455/67.7
See application file for complete search history.

(56) References Cited

U.S. PATENT DOCUMENTS

2001/0007818 A1 * 7/2001 Ichikawa ..................... 455/425
2004/0127191 A1 * 7/2004 Matsunaga .................. 455/403

FOREIGN PATENT DOCUMENTS

EP        1 018 846 A1    7/2000
JP        2001-519619 A   10/2001

* cited by examiner

Primary Examiner—Binh K Tieu
(74) Attorney, Agent, or Firm—Sughrue Mion, PLLC

(57) ABSTRACT

The present invention aims to provide the radio access network system which can analyze a fault during call processing by a mobile terminal. A control equipment for controlling calls for a mobile terminal and a relay equipment for relaying control signals between the mobile terminal and the control equipment monitor control signals during the call processing for the specified mobile terminal. A data collection and analysis equipment receives and processes those monitored control signals for a fault analysis.

9 Claims, 5 Drawing Sheets

RADIO ACCESS NETWORK SYSTEM AND A METHOD OF FAULT ANALYSIS FOR THE SYSTEM THEREOF

BACKGROUND OF THE INVENTION

1. Field of the Invention

The present invention relates to a radio access network system which can analyze a location of fault and a cause of fault when fault occurs in the network.

2. Description of the Related Art

In recent years, many mobile terminals such as cellular phones are used increasingly. In a radio access network system for mobile terminals, a communication fault occurs for various reasons of network circuits. Therefore, quick analysis of the fault and quick restoration from the fault are desired. A user asks a network operator a cause of fault generated, if a certain fault occurs. The network operator needs a method and system for analyzing efficiently a factor of generated fault and a location of generated fault in order to cope with inquiries from users about such faults quickly.

In the conventional radio access network, an analyzing method, which monitors a mobile terminal to which the communication is terminated or a signal which flows on a control equipment, and outputs collected information to a file, and then finds out a fault location by analyzing the file using analysis tools, is generally used.

On the other hand, in the radio access network, a lot of relay equipments for relaying a signal which flows between endpoints of the network exist. Therefore, a fault generated within these relay equipment cannot be found out easily from such a collected information. For this reason, in the conventional analyzing method of fault, it combines information collected within each relay equipment and information collected with a mobile terminal or with a control equipment based on time information when the signal monitor was carried out, and then, a location of fault and cause of fault are analyzed from these combined information. However, this conventional analyzing method takes a great man power.

In Japanese Patent Laid-Open No. 2001-519619, a test method, in which a command for acquiring data is transmitted to respective management agents connected to each of nodes in the network, data acquired by respective management agents according to the command is collected by any one management agent and analyzed as a whole, is disclosed. However, this test method aims at examinations before network service in, an examination of a network quality assessment, etc., and it is not disclosed about analysis of faults of live communication after service in.

SUMMARY OF THE INVENTION

The present invention aims to provide the radio access network system adopting an analyzing method which can efficiently find out the fault location and the cause of fault when a specific user declares the fault after service in.

To achieve the object, a radio access network system according to the present invention gives an analysis of fault for radio communications of a mobile terminal, and has a control equipment for controlling calls for the mobile terminal, a relay equipment for relaying control signals between the mobile terminal and the control equipment, and a data collection and analysis equipment for data processing.

The control equipment receives a signal analysis request command with a user identifier to be monitored, then, transmits a signal monitor request including the user identifier to the relay equipment, also, performs monitoring operation for control signals of calls related to the mobile terminal specified by the user identifier in accordance with the signal analysis request command, and transmits monitored control signals to the data collection and analysis equipment when the monitoring operation has been completed.

The relay equipment receives the signal monitor request, performs monitoring operation for control signals of calls related to the mobile terminal specified by the user identifier in accordance with the signal monitor request, and transmits monitored control signals to the data collection and analysis equipment when the monitoring operation has been completed.

The data collection and analysis equipment receives monitored control signals transmitted from the control equipment and the relay equipment, combines the monitored control signals from the control equipment and the monitored control signals from the relay equipment based on the user identifier, reorders the combined control signals based on time index attached to respective control signals, and outputs the reordered control signals for fault analysis.

According to the radio access network system of the present invention, the control equipment, which controls a call for the mobile terminal as an object for analysis, and the relay equipment, which relays the call, monitor the signal from the mobile terminal and generates the monitor information respectively, and the data collection and analysis equipment combines the those monitor information based on the user identifier and reorders the combined monitor information based on time index attached to respective information, and outputs the reordered control signals for fault analysis.

Therefore, the monitor information required for analysis of fault is acquired during connection of the call for the mobile terminal as an object for analysis, and analysis of fault is conducted quickly.

The control equipment can be a RNC (Radio Network Controller) which manages the mobile terminal, for example, and the relay equipment can be a radio base station or a signal repeater which relays a signal of the mobile terminal.

The timing for transmitting the signal monitor request to the relay equipment can be a timing, for example, when the control equipment detects a call connection request or a call termination request with respect to the mobile terminal having the user identifier which coincides with the user identifier memorized in the memory as the target user for analysis of fault.

Further, according to the present invention, it is desired that the control equipment receives the signal analysis request from a console provided in a network management center of a network operator and connected to the radio access network. The user, for example, who has encountered a certain fault using the mobile terminal, declares the fact of fault to the network operator, then, the network operator transmits the signal analysis request command including the user identifier to the control equipment from the console for performing the analysis of fault for the user.

It is also desired, according to the present invention, that the signal analysis request includes classification information to specify the signal to be monitored at the control equipment and the relay equipment. In this case, as the signal necessary for analysis the fault is specified, the result of analysis can be obtained quickly.

It is also desired, according to the present invention, that the respective signal analysis request command and signal monitor request include information to control the monitoring operation to start, to suspend, to resume, or to cancel at the control equipment and the relay equipment. In this case, monitoring operation can be performed in accordance with a network situation, a priority of fault analysis, etc.

BRIEF DESCRIPTION OF THE DRAWINGS

Exemplary features and advantages of the present invention will become apparent from the following detailed description when taken with the accompanying drawings in which.

DESCRIPTION OF THE EXEMPLARY EMBODIMENTS

There will now be described an embodiment of the present invention with reference to the accompanying drawings.

Figure 1:
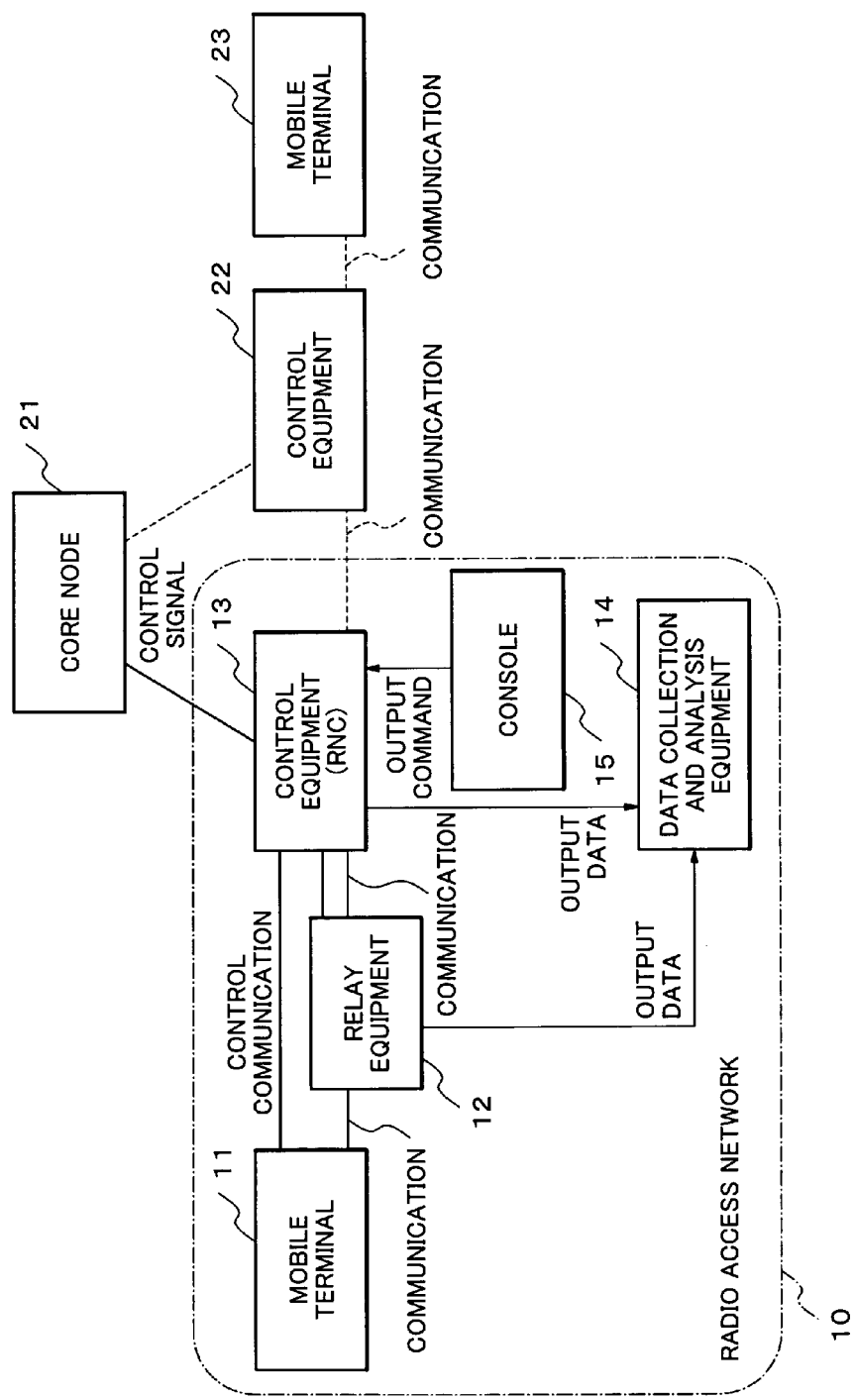
FIG. 1 is a block diagram of a radio access network system according to one embodiment of the present invention.

FIG. 1 shows composition of a radio access network system concerning one embodiment of the present invention. The radio access network system 10 comprises the mobile terminal 11, the relay equipment 12 which receives and relays radio signals from the mobile terminal 11, the control equipment 13 which receives signals from the mobile terminal 11 via the relay equipment 12 and controls a call of the mobile terminal 11, the console 15 used by the network operator, and the data collection and analysis equipment 14 which collects and analyzes information monitored by the control equipment 13 and the relay equipment 12. This radio access network system 10 is connected with another radio access network system containing the control equipment 22 which manages the mobile terminal 23 as the communication partner of mobile terminal 11, or a wired network system via the core node 21.

The control equipment 13 has the function to exchange control signals between the mobile terminal 11 and two or more relay equipments 12, in order to control call establishment/release between the mobile terminal 11 and the mobile terminal 23 as the communication partner. The console 15 has the function to provide instructions for monitoring of these control signals to be registered, suspended, resumed or canceled to the control equipment 13 with the user identifier which specifies the mobile terminal as a target to be monitored. The relay equipment 12 has the function to perform monitoring operation based on requests, which includes monitoring of communication data to be registered, suspended, resumed or canceled, instructed by the control equipment 13. The data collection and analysis equipment 14, generally installed in the console 15, has the function to receive and combine the monitored information reported from the control equipment 13 and the relay equipment 12, to analyze the combined information, and to find out the location where the fault has occurred and the cause of fault.

When the network operator has received an inquiry from a user who declares a trouble or a fault in his/her use of the mobile terminal, the network operator inputs the signal analysis request command in the console 15 together with the user identifier for instructing the control equipment 13 to monitor signals related to the user. In the signal analysis request, the signal category to be monitored can be specified depending on several situations such as a network congestion state, system performance, a priority of analysis, and an analysis situation, etc., to control the amount of signals to be acquired. For example, "Layer 3 message" is only specified among "Layer 1, 2, 3 protocol" in control signals transmitted by the user terminal at an early stage of signal analysis. Go along with the progress of analysis, the signal to be monitored can be increased. Time for monitor can also be specified, or suspension, resuming and cancellation of monitor can be controlled even after monitoring has been commenced.

FIGS. 2-5 are flow charts which show processing in the radio access network system of the embodiment.

Figure 2:
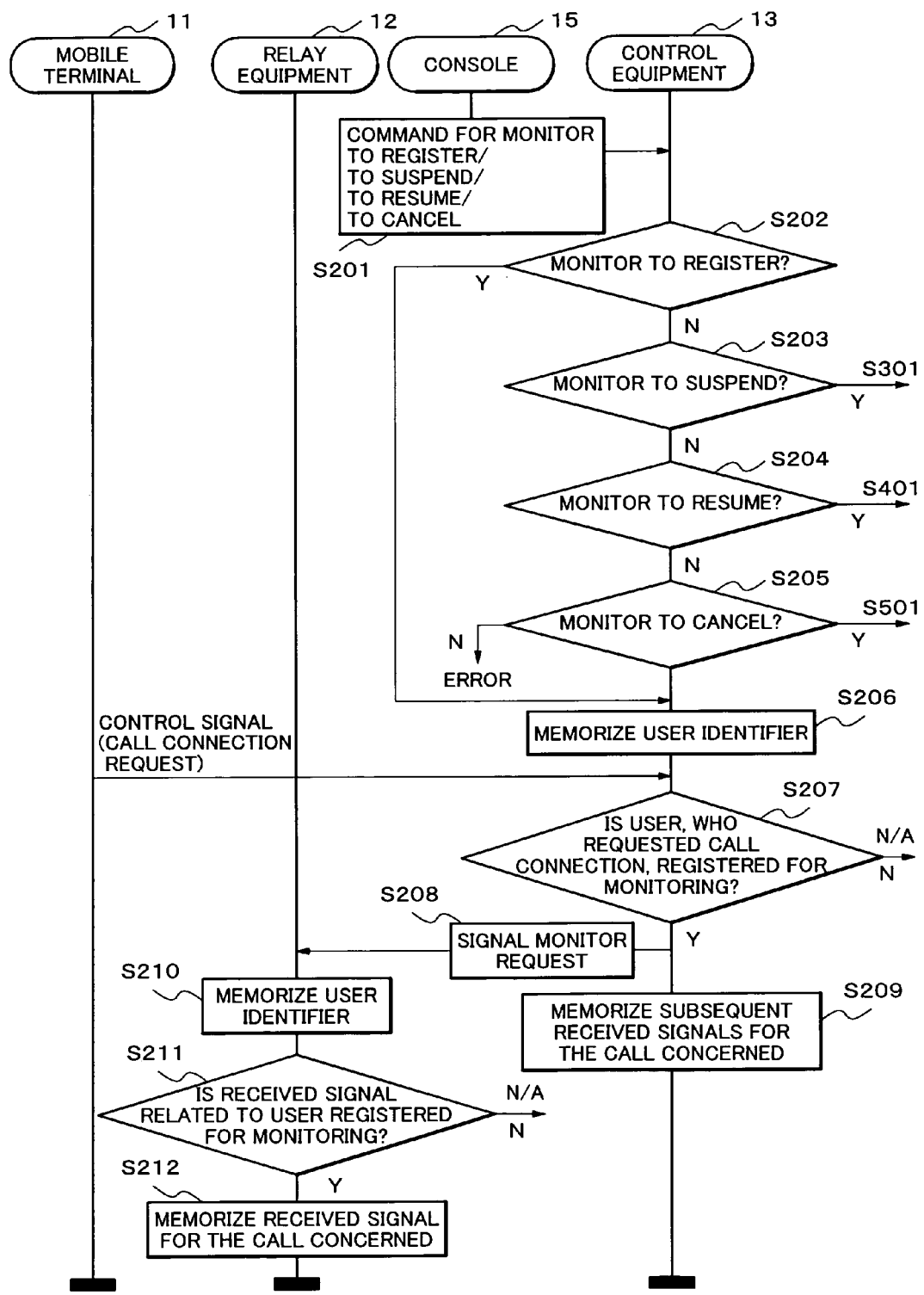
FIG. 2 is a flow chart showing processing in the radio access network system of FIG. 1.

In FIG. 2, the console 15 transmits the signal analysis request command to the control equipment 13 to register the monitoring operation, which monitors control signals exchanged between mobile terminals for call establishment and call releasing, with the user identifier to specify the target to be monitored (Step S201). In the signal analysis request command transmitted by the console 15 at Step S201, the subsequent instruction of monitor registration such as monitor suspension, monitor resuming or monitor cancelling can be included.

The control equipment 13 confirms the instruction included in the signal analysis request command transmitted by the console 15, whether it is monitor registration, monitor suspension, monitor resuming or monitor cancelling (Steps S202-S205), and progresses to Step S206, S301, S401, and S501 according to the contents of received instruction.

When the instruction of Step S201 is monitor registration, it progresses to Step S206 from Step S202, and the user identifier included in the signal analysis request command is memorized in a memory. Then, when the control signal of call connection request is transmitted from the mobile terminal 11, it is checked whether the user identifier contained in the control signal coincides with the user identifier memorized in the memory (Step S207). If the user identifier contained in the control signal coincides with the user identifier memorized in the memory, the signal monitor request is transmitted from the control equipment 13 to the relay equipment 12 with the user identifier concerned for requesting signal monitoring (Step S208). After this, the control equipment 13 performs the monitoring operation of the control signal of the call concerned, and memorizes monitored signals to the memory (Step S209). At this time, the control equipment 13 memorizes each control signal with a time index which indicates the time when the control signal is monitored. At Step S207, if the same user identifier as the user identifier contained in the control signal from the mobile terminal 11 is not memorized in the memory, the control equipment 13 stops processing.

The relay equipment 12 memorizes the user identifier contained in the signal monitor request received from the control equipment 13 at Step S208 to a memory of the relay equipment 12 (Step S210). The relay equipment 12 checks the user identifier contained in each of the control signal and its response signal, which are received from/transmitted to the control equipment 13 during the subsequent call processing, and confirms whether the user identifier contained in each of the control signal and its response signal coincides with the user identifier memorized in the memory (Step S211). If the user identifier contained in each of the control signal and its response signal coincides with the user identifier memorized in the memory, the relay equipment 12 memorizes the control signal concerned in the memory (Step S212). At this time, the relay equipment 12 memorizes each control signal with a time index which indicates the time when the control signal is monitored.

Figure 3:
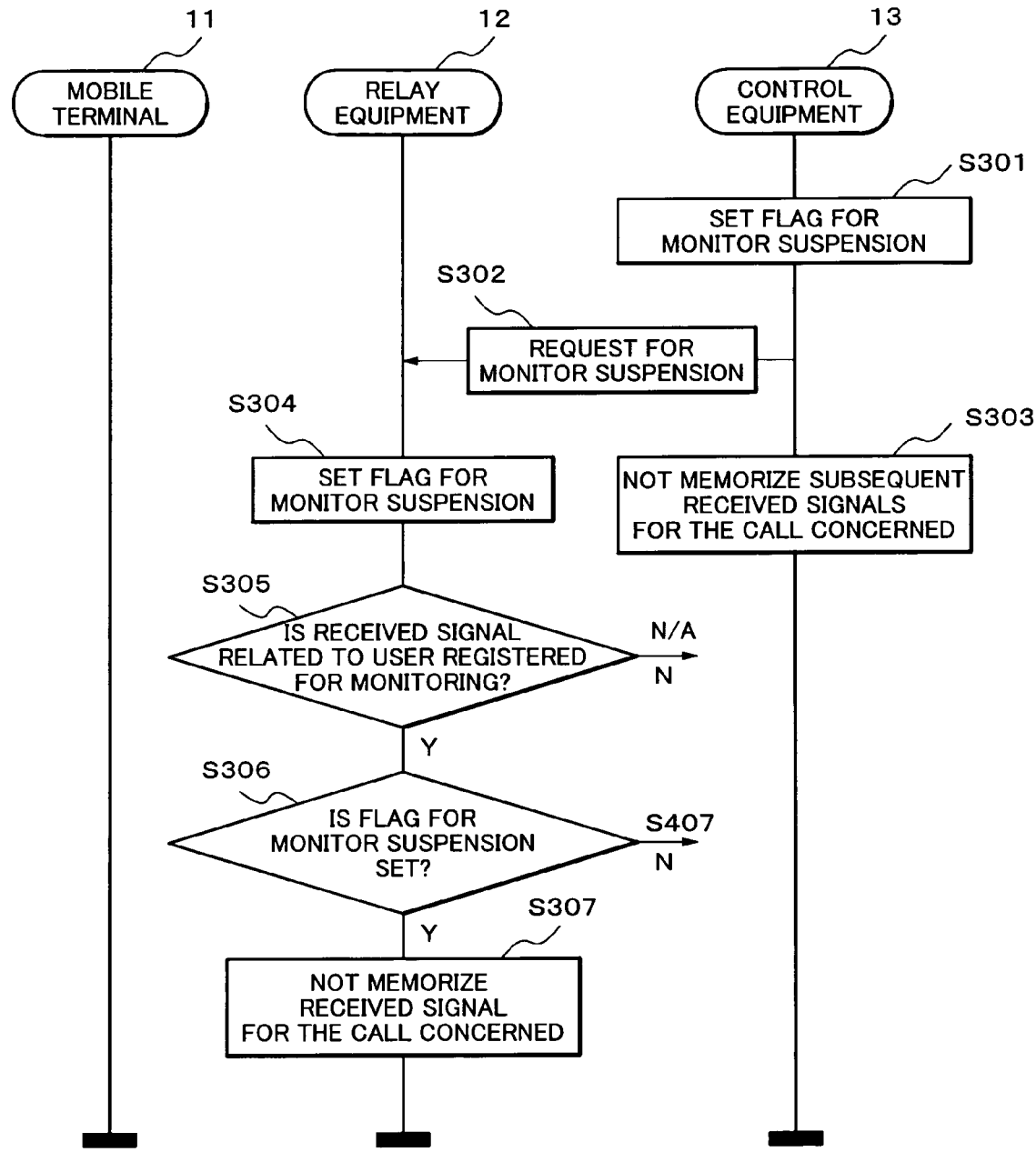
FIG. 3 is a flow chart showing another processing in the radio access network system of FIG. 1.

When the signal analysis request command at Step S201 includes the instruction to suspend monitoring operation, the processing progresses to Step S3101 of FIG. 3, and the control equipment 13 sets a flag showing that monitoring operation of the call, which is specified by the user identifier contained in the signal analysis request command, is being suspended. Then, the control equipment 13 transmits the monitoring suspension request for the control signals of the call identified by the user identifier to the relay equipment 12 with the user identifier concerned (Step S302). After this, the control equipment 13 stops memorizing the control signal of the call concerned to the memory (Step S303).

When the relay equipment 12 receives the monitoring suspension request with the user identifier from the control equipment 13 at Step s302, the relay equipment 12 sets a flag showing that monitoring operation of the call, which is specified by the user identifier, is being suspended (Step S304). The relay equipment 12 checks the user identifier contained in each of the control signal and its response signal, which are received from/transmitted to the control equipment 13 during the subsequent call processing, and confirms whether the user identifier contained in each of the control signal and its response signal coincides with the user identifier memorized in the memory (Step S305) If the user identifier contained in each of the control signal and its response signal coincides with the user identifier memorized in the memory, the relay equipment 12, then, confirms whether the flag of monitor suspension is set or not (Step S306). The relay equipment 12 stops memorizing the control signal of the call concerned to the memory if the flag of monitor suspension is being set (Step S307).

Figure 4:
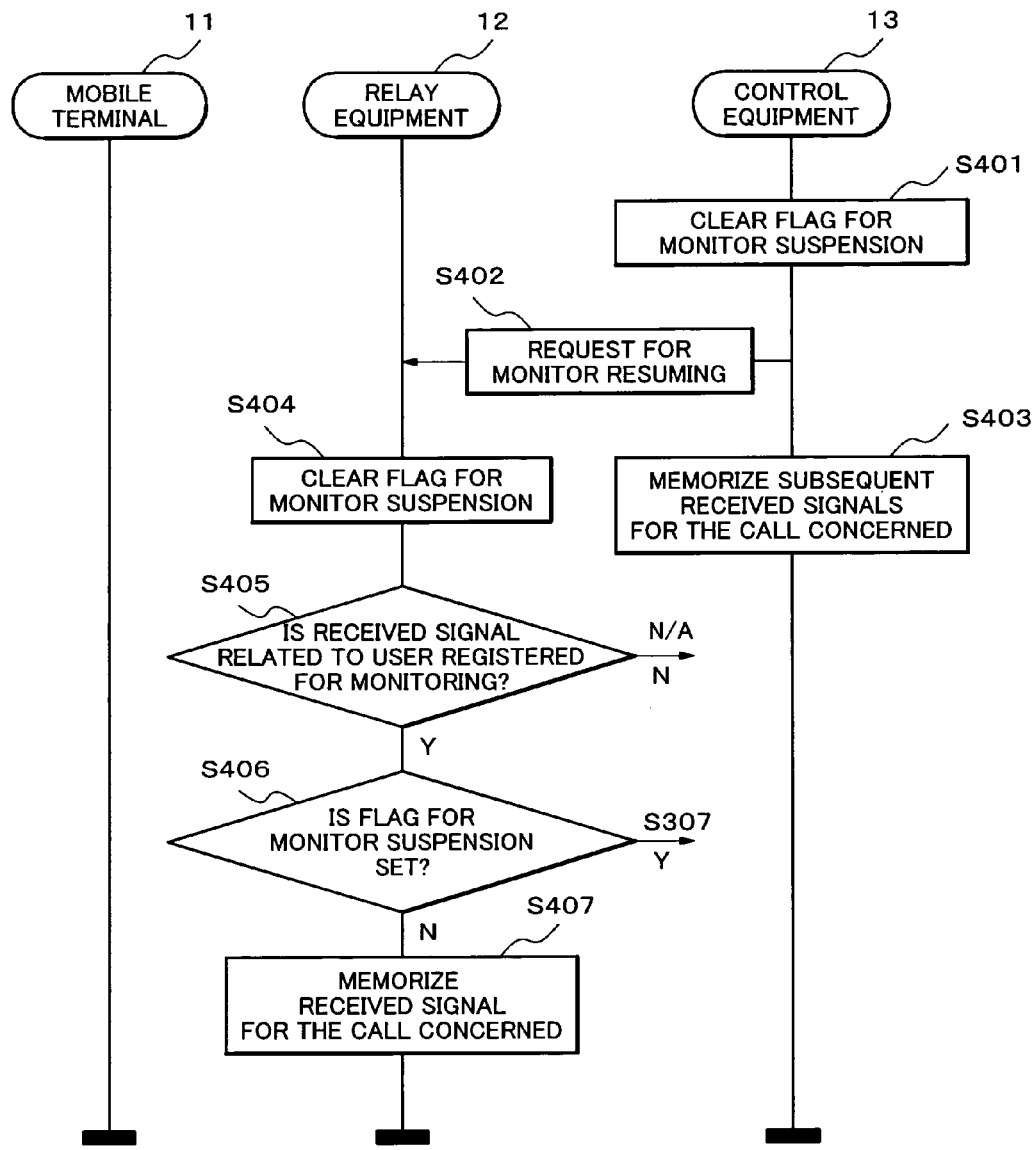
FIG. 4 is a flow chart showing another processing in the radio access network system of FIG. 1.

When the instruction of Step S201 is monitor resuming, it progresses to Step S401 of FIG. 4 from Step S204, and the control equipment 13 clears the flag of monitor suspension for the call corresponding to the user identifier contained in the signal analysis request command (Step S401). Then, the control equipment 13 transmits the monitoring resuming request for the control signals of the call identified by the user identifier to the relay equipment 12 with the user identifier concerned (Step S402). After this, the control equipment 13 starts to memorize the control signal of the call concerned to the memory with the time index which indicates the time when the control signal is monitored (Step S403).

When the relay equipment 12 receives the monitoring resuming request with the user identifier from the control equipment 13 at Step s402, the relay equipment 12 clears the flag of monitor suspension for the call corresponding to the user identifier (Step S404). The relay equipment 12 checks the user identifier contained in each of the control signal and its response signal, which are received from/transmitted to the control equipment 13 during the subsequent call processing, and confirms whether the user identifier contained in each of the control signal and its response signal coincides with the user identifier memorized in the memory (Step S405). If the user identifier contained in each of the control signal and its response signal coincides with the user identifier memorized in the memory, the relay equipment 12, then, confirms whether the flag of monitor suspension is set or not (Step S406). The relay equipment 12 memorizes the control signal of the call concerned to the memory with the time index which indicates the time when the control signal is monitored if the flag of monitor suspension is being cleared (Step S407).

Figure 5:
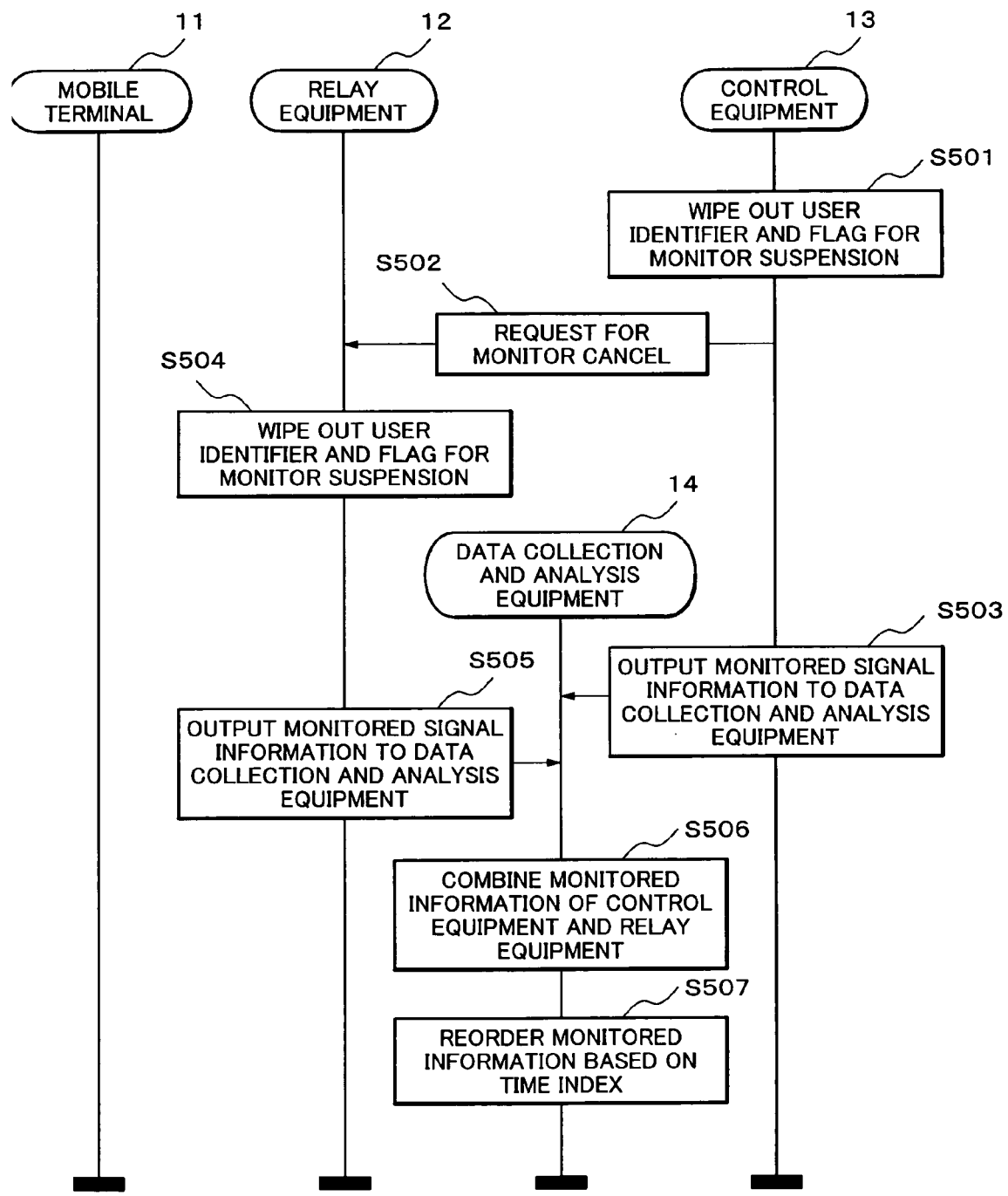
FIG. 5 is a flow chart showing another processing in the radio access network system of FIG. 1.

When the instruction of Step S201 is monitor cancelling, it progresses to Step S501 of FIG. 5 from Step S205, and the control equipment 13 wipes out the flag for the call corresponding to the user identifier contained in the signal analysis request command, and also wipes out the user identifier memorized in the memory (Step S501). Then, the control equipment 13 transmits the monitoring cancel request to the relay equipment 12 with the user identifier concerned (Step S502). After this, the control equipment 13 transmits the control signals of the call concerned, which have been accumulated and memorized in the memory as the monitoring result (Step S503). When the relay equipment 12 receives the monitoring cancel request at Step S502, the relay equipment 12 wipes out the flag for the call corresponding to the user identifier contained in the monitoring cancel request, and also wipes out the user identifier memorized in the memory (Step S504). Then, the relay equipment 12 transmits the control signals of the call concerned, which have been accumulated and memorized in the memory as the monitoring result (Step S505).

The data collection and analysis equipment 14 receives the control signals monitored by the control equipment 13 and the relay equipment 12, and combines them into a block of control signal information based on the user identifier (Step S506), and then, reorder them based on the time index attached to respective control signals (Step S507). The reordered control signal information is displayed on a display of console 15 or is printed by a printer. Based on the indication or printing, the network operator analyzes the control signal information, and finds out the location where the fault has occurred and a cause of the fault.

Although the above embodiment has explained a case where the number of control equipment 13 and relay equipments 12 was one respectively, it may possible to provide a plurality of relay equipments between the mobile terminal 11 and the control equipment 13, and also to provide a plurality of control equipments with associated relay equipment connected to each of control equipments, and collects the control signals from respective control equipments and relay equipments for the same call concerned. Also, the control signals to be monitored are not limited to those related to call establishment and call releasing, and other control signals related to the handover operation and the call termination from the core node can be monitored for the fault analysis by the present invention.

The previous description of embodiment is provided to enable a person skilled in the art to make and use the present invention. Moreover, various modifications to this embodiment will be readily apparent to those skilled in the art, and the generic principles and specific examples defined herein may be applied to other embodiments without the use of inventive faculty. Therefore, the present invention is not intended to be limited to the embodiment described herein but is to be accorded the widest scope as defined by the limitations of the claims and equivalents.

Further, it is noted that the inventor's intent is to refrain all equivalents of the claimed invention even if the claims are amended during prosecution.

What is claimed is:

1. A radio access network system which gives an analysis of fault for radio communications of a mobile terminal, the system comprising:

a control equipment for controlling calls for the mobile terminal, which receives a signal analysis request command with a user identifier to be monitored, outputs a signal monitor request including the user identifier and performs monitoring operation for control signals of calls related to the mobile terminal specified by the user identifier in accordance with the signal analysis request command, and outputs monitored control signals when the monitoring operation has been completed;

a relay equipment for relaying control signals between the mobile terminal and the control equipment, which receives the signal monitor request, performs monitoring operation for control signals of calls related to the mobile terminal specified by the user identifier in accordance with the signal monitor request, and outputs monitored control signals when the monitoring operation has been completed; and a data collection and analysis equipment, which receives monitored control signals output from the control equipment and the relay equipment, combines the monitored control signals from the control equipment and the monitored control signals from the relay equipment based on the user identifier, reorders the combined control signals based on time index attached to respective control signals, and outputs the reordered control signals for fault analysis.

2. The radio access network system according to claim 1, further comprising:

A console to be used by a network operator, which generates the signal analysis request command and transmits the signal analysis request command with the user identifier to specify the mobile terminal to be monitored to the control equipment.

3. The radio access network system according to claim 1, wherein the signal analysis request command includes classification of signal to specify the control signal to be monitored at the control equipment, and the signal monitor request command includes classification of signal, which has been specified by the signal analysis request command, to specify the control signal to be monitored at the relay equipment.

4. The radio access network system according to claim 3, wherein the signal analysis request command further includes information to control the monitoring operation to start, to suspend, to resume, or to cancel at the control equipment, and the signal monitor request further includes information to control the monitoring operation to start, to suspend, to resume, or to cancel at the relay equipment.

5. The radio access network system according to claim 4, wherein the control equipment stops the monitoring operation when receiving the information to cancel the monitoring operation, and transmits the monitored control signals to the data collection and analysis equipment.

6. The radio access network system according to claim 4, wherein the relay equipment stops the monitoring operation when receiving the information to cancel the monitoring operation, and transmits the monitored control signals to the data collection and analysis equipment.

7. A method of fault analysis for a radio access network system provided with a mobile terminal, a control equipment for controlling calls for the mobile terminal, a relay equipment for relaying control signals between the mobile terminal and the control equipment, and a data collection and analysis equipment for data processing, the method comprising:

receiving a signal analysis request command, at the control equipment, with a user identifier which specifies the mobile terminal to be monitored;

transmitting a signal monitor request, from the control equipment to the relay equipment, including the user identifier which has been received with the signal analysis request command;

performing monitoring operation, at the control equipment, for control signals of calls related to the mobile terminal specified by the user identifier in accordance with the signal analysis request command;

receiving the signal monitor request, at the relay equipment;

performing monitoring operation, at the relay equipment, for control signals of calls related to the mobile terminal specified by the user identifier in accordance with the signal monitor request;

transmitting monitored control signals, from the respective control equipment and relay equipment to the data collection and analysis equipment, when the monitoring operation has been completed;

combining the monitored control signals received from the respective control equipment and relay equipment based on the user identifier, at the data collection and analysis equipment;

reordering the combined control signals based on time index attached to respective control signals, at the data collection and analysis equipment; and outputting the reordered control signals, from the data collection and analysis equipment, for fault analysis.

8. The method of fault analysis for a radio access network system according to claim 7, wherein the signal analysis request command includes classification of signal to specify the control signal to be monitored at the control equipment, and the signal monitor request command includes classification of signal, which has been specified by the signal analysis request command, to specify the control signal to be monitored at the relay equipment.

9. The method of fault analysis for a radio access network system according to claim 8, the signal analysis request command further includes information to control the monitoring operation to start, to suspend, to resume, or to cancel at the control equipment, and the signal monitor request further includes information to control the monitoring operation to start, to suspend, to resume, or to cancel at the relay equipment.

* * * * *